US008949917B2

(12) United States Patent
Johnson et al.

(10) Patent No.: US 8,949,917 B2
(45) Date of Patent: Feb. 3, 2015

(54) SYSTEM AND METHOD FOR PROVIDING SEQUENTIAL VIDEO AND INTERACTIVE CONTENT

(75) Inventors: Bradley G. Johnson, Brooklyn, NY (US); Simon A. Assaad, Far Hills, NJ (US); David V. Carson, Westport, CT (US); John S. Penberthy, Croton on Hudson, NY (US)

(73) Assignee: Utrom Processing Co. L.L.C., Wilmington, DE (US)

( * ) Notice: Subject to any disclaimer, the term of this patent is extended or adjusted under 35 U.S.C. 154(b) by 702 days.

(21) Appl. No.: 13/094,011

(22) Filed: Apr. 26, 2011

(65) Prior Publication Data

US 2011/0202953 A1 Aug. 18, 2011

Related U.S. Application Data

(63) Continuation of application No. 12/130,433, filed on May 30, 2008, now abandoned, which is a continuation-in-part of application No. 11/963,352, filed on Dec. 21, 2007, now abandoned, and a (Continued)

(51) Int. Cl.
*H04N 7/173* (2011.01)
*H04N 7/10* (2006.01)
(Continued)

(52) U.S. Cl.
CPC ............ *G06Q 30/02* (2013.01); *G06Q 30/0261* (2013.01); *G06Q 30/0269* (2013.01); *H04N 21/23424* (2013.01); *H04N 21/25883* (2013.01); *H04N 21/812* (2013.01)
USPC ................... 725/109; 725/32; 725/34; 725/35

(58) Field of Classification Search
CPC .......... G06Q 30/0261; G06Q 30/0269; H04N 21/23424; H04N 21/25883; H04N 21/812; H04N 21/2589; H04N 21/2668
USPC ........... 725/32, 34–36, 42, 46–47, 50–52, 61, 725/112, 135
See application file for complete search history.

(56) References Cited

U.S. PATENT DOCUMENTS 6,757,661 B1  6/2004  Blaser et al.
6,976,010 B2 12/2005 Banerjee et al.
(Continued)

FOREIGN PATENT DOCUMENTS

WO     WO 02/17205     2/2002

OTHER PUBLICATIONS

U.S. Appl. No. 61/053,511, filed May 15, 2008, Assaad et al.
(Continued)

*Primary Examiner* — Hai V Tran
(74) *Attorney, Agent, or Firm* — Christensen O'Connor Johnson Kindness PLLC

(57) ABSTRACT

A system and method of providing sequential video and contextual based content to an end user viewing video content in a video player on an end user computing device is provided. In one embodiment, the method comprises storing a plurality of videos in a memory, storing a plurality of advertisements in a memory, receiving a plurality of requests from a plurality of different clients and wherein each request includes information identifying a first video and each of the plurality of clients initiates its request from one of a plurality of web pages and wherein the plurality of web pages form part of a plurality of different web sites. In addition, the plurality of web pages may include program code configured to cause a video to be presented in the video player. The method further comprises for each received request, selecting a plurality of videos based on information of the first video; and selecting a plurality of advertisements, wherein at least one of the plurality of advertisements is selected based on information of the first video and at least one of the plurality of advertisements is selected based on information of a selected video. In addition, the method may comprise for each received request, transmitting the plurality of videos to the requesting client for sequential presentation by the client; and transmitting the plurality of advertisements to the requesting client and wherein at least some of the plurality of advertisements are configured to be presented concurrently with a received video.

20 Claims, 10 Drawing Sheets

Related U.S. Application Data continuation-in-part of application No. 11/750,665, filed on May 18, 2007, now abandoned.

(60) Provisional application No. 60/941,354, filed on Jun. 1, 2007.

(51) Int. Cl.
| | | |
|---|---|---|
| *H04N 7/025* | (2006.01) | |
| *G06Q 30/02* | (2012.01) | |
| *H04N 21/234* | (2011.01) | |
| *H04N 21/258* | (2011.01) | |
| *H04N 21/81* | (2011.01) | |

(56) References Cited

U.S. PATENT DOCUMENTS

| | | | |
|---|---|---|---|
| 7,406,499 | B2 | 7/2008 | Singh et al. |
| 7,487,112 | B2 | 2/2009 | Barnes, Jr. |
| 7,584,194 | B2 * | 9/2009 | Tuttle et al. .................. 715/234 |
| 7,769,827 | B2 | 8/2010 | Girouard et al. |
| 8,065,708 | B1 * | 11/2011 | Smyth et al. .................. 725/93 |
| 2002/0138844 | A1 | 9/2002 | Otenasek et al. |
| 2002/0178447 | A1 | 11/2002 | Plotnick |
| 2003/0083938 | A1 * | 5/2003 | Smith et al. .................. 705/14 |
| 2004/0010467 | A1 | 1/2004 | Hori et al. |
| 2004/0225612 | A1 | 11/2004 | Shimojima et al. |
| 2005/0010475 | A1 | 1/2005 | Perkowski |
| 2005/0047752 | A1 | 3/2005 | Wood et al. |
| 2005/0144136 | A1 | 6/2005 | Murashita |
| 2005/0234779 | A1 | 10/2005 | Chiu |
| 2006/0026067 | A1 | 2/2006 | Nicholas |
| 2006/0095507 | A1 | 5/2006 | Watson |
| 2006/0135142 | A1 | 6/2006 | Repka |
| 2006/0168510 | A1 | 7/2006 | Bryar et al. |
| 2006/0173985 | A1 | 8/2006 | Moore |
| 2007/0038567 | A1 | 2/2007 | Allaire et al. |
| 2007/0101361 | A1 | 5/2007 | Spielman |
| 2007/0107010 | A1 | 5/2007 | Jolna |
| 2007/0156521 | A1 | 7/2007 | Yates |
| 2007/0157228 | A1 * | 7/2007 | Bayer et al. .................. 725/34 |
| 2007/0180523 | A1 | 8/2007 | Jablonski et al. |
| 2007/0198339 | A1 | 8/2007 | Shen |
| 2007/0214498 | A1 | 9/2007 | Pindra et al. |
| 2007/0219910 | A1 | 9/2007 | Martinez |
| 2007/0238474 | A1 | 10/2007 | Ballas et al. |
| 2007/0240039 | A1 | 10/2007 | Hosotsubo |
| 2007/0250467 | A1 | 10/2007 | Mesnik et al. |
| 2007/0266403 | A1 | 11/2007 | Ou |
| 2007/0282819 | A1 | 12/2007 | Lynn et al. |
| 2007/0288950 | A1 | 12/2007 | Downey et al. |
| 2007/0299935 | A1 | 12/2007 | Plastina et al. |
| 2008/0010112 | A1 | 1/2008 | Kniaz et al. |
| 2008/0027931 | A1 | 1/2008 | Lu et al. |
| 2008/0066172 | A1 | 3/2008 | Tarsi |
| 2008/0092189 | A1 | 4/2008 | Baker et al. |
| 2008/0097830 | A1 | 4/2008 | Kim |
| 2008/0115161 | A1 * | 5/2008 | Kurzion .................. 725/32 |
| 2008/0120156 | A1 | 5/2008 | Nusbaum |
| 2008/0120668 | A1 | 5/2008 | Yau |
| 2008/0126364 | A1 | 5/2008 | Khosravy et al. |
| 2008/0134249 | A1 | 6/2008 | Yang et al. |
| 2008/0148322 | A1 | 6/2008 | Howcroft |
| 2008/0155588 | A1 * | 6/2008 | Roberts et al. .................. 725/34 |
| 2008/0215675 | A1 | 9/2008 | Kaminitz et al. |
| 2008/0263602 | A1 | 10/2008 | Murray et al. |
| 2008/0271080 | A1 | 10/2008 | Gossweiler et al. |
| 2008/0294647 | A1 | 11/2008 | Ramaswamy |
| 2009/0199230 | A1 * | 8/2009 | Kumar et al. .................. 725/32 |
| 2010/0146077 | A1 | 6/2010 | Davies et al. |
| 2010/0274815 | A1 | 10/2010 | Vanasco |
| 2011/0093926 | A1 | 4/2011 | Martin et al. |
| 2011/0314368 | A1 | 12/2011 | Chevalier |

OTHER PUBLICATIONS

U.S. Appl. No. 11/963,248, filed Dec. 21, 2007, Johnson et al.
U.S. Appl. No. 12/465,907, filed May 14, 2009, Penberthy et al.
U.S. Appl. No. 12/026,390, filed Feb. 5, 2008, Johnson et al.
U.S. Appl. No. 11/750,665, filed May 18, 2007, Carson et al.
International Search Report mailed May 13, 2008, in International Patent Application No. PCT/US2007/083578, filed Nov. 5, 2007, 2 pages.
Written Opinion mailed May 13, 2008, in International Patent Application No. PCT/US2007/083578, filed Nov. 5, 2007, 6 pages.

* cited by examiner

SYSTEM AND METHOD FOR PROVIDING SEQUENTIAL VIDEO AND INTERACTIVE CONTENT

CROSS REFERENCE TO RELATED APPLICATIONS

This application claims priority to, and is a continuation of, U.S. patent application Ser. No. 12/130,433, filed May 30, 2008 now abandoned, which is a continuation-in-part of U.S. patent application Ser. No. 11/963,352, filed Dec. 21, 2007 now abandoned, a continuation-in-part of U.S. patent application Ser. No. 11/750,665, filed May 18, 2007, now abandoned and claims priority to U.S. Provisional Patent Application No. 60/941,354 filed Jun. 1, 2007, all of which are incorporated herein by reference in their entirety for all purposes.

FIELD OF THE INVENTION

The present invention generally relates to a system and method for delivering video and interactive content and more particularly, to a system and method for selecting and delivering a plurality of videos and interactive content to users via a packet based communication system such as the Internet.

BACKGROUND OF THE INVENTION

In broadcast networks, such as broadcast television and radio, video content is inserted into the media stream for presentation to all the end users tuned to a particular channel. In conventional internet based video delivery systems, a user selects a video to watch that is received and viewed by the user. After the initial video is watched, the user typically must select another video to watch.

Furthermore, in broadcast networks the same advertisement is typically inserted into the media stream for presentation to all the end users. In such networks, there typically is no means for determining with precision how many end users experienced (e.g., viewed) an advertisement, which end users experienced the advertisement, or which end users responded to the advertisement. In addition, advertisements communicated via a broadcast network are not interactive, and, therefore, do not allow the operator to provide contextual advertising based on information about the viewer (e.g., the view's location, demographics, etc.), allow the viewer to supply personal information or request additional information, or facilitate impulse responses to the advertisements.

In contrast, interactive networks such as the internet are more amenable to the selective and precise distribution of video and advertising. Internet advertising in which advertisements are sold based on the number of impressions or the number of click-throughs is well known. Typically, such internet advertisements comprise a still image (e.g., a banner ad) or a hyperlink that is presented as part of a static web page.

When the user requests a video, it would be desirable to provide additional videos as well as advertisements that are selected to be pertinent to the requested video and/or contextual information of the end user such as the user's location, demographics, personal information, user's interests, information about the end user's computing device, information about the network to which the end user's computer is connected, and/or other information. In addition, it would be desirable to provide advertisements associated with one or more of the provided videos that are pertinent to the content of the video(s) such as the subject matter of the video, rating of the video, the contextual information, and/or other information.

Obtaining the contextual information, however, can be challenging. For example, end users typically do not wish to be bothered with providing information each time he or she views a video. Providing contextual advertisements—especially wherein the advertisement is personalized to the end user (e.g., includes the end user's name)—and customizing the video content based on the contextual information provides additional challenges. Consequently, there is a need for a system and method for selecting and providing video content and contextual advertisements for presentation with the selected video in a packet based communication system such as the Internet.

These and other advantages are provided by various embodiments of the present invention.

SUMMARY OF THE INVENTION

The present invention provides a system and method of providing sequential video and contextual based content to an end user viewing video content in a video player on an end user computing device. In one embodiment, the method comprises storing a plurality of videos in a memory, storing a plurality of advertisements in a memory, receiving a plurality of requests from a plurality of different clients and wherein each request includes information identifying a first video and each of the plurality of clients initiates its request from one of a plurality of web pages and wherein the plurality of web pages form part of a plurality of different web sites. In addition, the plurality of web pages may include program code configured to cause a video to be presented in the video player. The method further comprises for each received request, selecting a plurality of videos based on information of the first video; and selecting a plurality of advertisements, wherein at least one of the plurality of advertisements is selected based on information of the first video and at least one of the plurality of advertisements is selected based on information of a selected video. In addition, the method may comprise for each received request, transmitting the plurality of videos to the requesting client for sequential presentation by the client; and transmitting the plurality of advertisements to the requesting client and wherein at least some of the plurality of advertisements are configured to be presented concurrently with a received video.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF ILLUSTRATIVE EMBODIMENTS

In the following description, for purposes of explanation and not limitation, specific details are set forth, such as particular networks, communication systems, computers, terminals, devices, components, techniques, advertisements, ad units, ad unit types, servers, communication paths, data and network protocols, software products and systems, operating systems, development interfaces, hardware, etc. in order to provide a thorough understanding of the present invention.

However, it will be apparent to one skilled in the art that the present invention may be practiced in other embodiments that depart from these specific details. Detailed descriptions of well-known networks, communication systems, computers, terminals, devices, components, techniques, advertisements, ad units, ad unit types, servers, communication paths, data and network protocols, software products and systems, operating systems, development interfaces, and hardware are omitted so as not to obscure the description.

System Architecture and General Design Concepts

The present invention provides a system and method for selecting and distributing a sequential video content and interactive content such as contextual based advertisements (presented with the sequential video content) in a packet based communication system such as the Internet. Currently, video players typically play one video at a time and after the video has completed, the user is returned to the previous web page. The present invention facilitates media sequencing which allows users to "sit back and enjoy the show" (e.g., a sequence of videos and interactive content) without needing to actively interact with the web site. After completion of a video, another video is loaded into the video player and played automatically, indefinitely. Users may elect to skip videos and/or choose other videos to watch.

The contextual advertisements may include advertisements (sometimes also referred to herein as "advertising" or "ads") that are displayed before the video, concurrently with the video, between videos, between segments of a video, and/or after completion of a video. Specific examples of such advertisements are provided below. The interactive content may include control logic to control the display and/or selection of the contextual advertisements and to interact with the end user and/or the video player.

Videos may stream uninterruptedly or periodically as the need for additional videos is detected by the interactive content. Without reloading the web page, ads and other content on the page may change as new videos are played within the video player. The URL and title tag of the video (in the video player) may change to reflect the current video being played.

Figure 1:
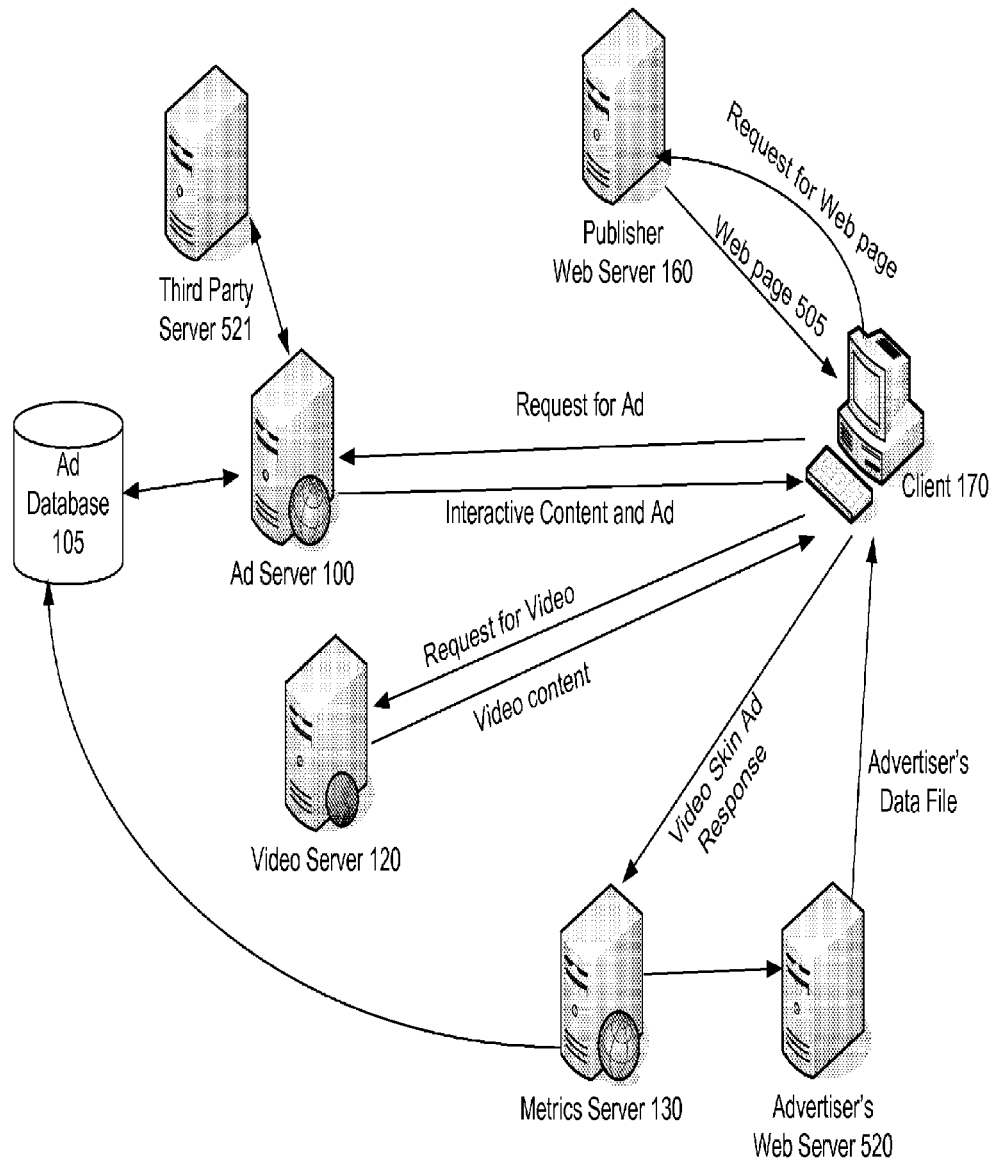
FIG. 1 is a functional block diagram of one example architecture that may be used to implement some example embodiments of the present invention.

FIG. 1 illustrates the functional components of one example environment that may be used to provide videos and interactive content according to one example embodiment of the present invention. This example environment includes an ad server 100, ad database 105, video server 120, metrics server 130, advertiser's server 520, publisher web server 160, third party servers 521, and the client 170 (e.g., a web browser executing on the end user's computing device). As will be evident to those skilled in the art, in practice there would likely be a plurality of publisher web servers 160, clients 170, and other servers. However for ease of explanation only one of each is illustrated. In addition, this architecture is one example of one architecture for implementing some embodiments of the present invention and the present invention may be implemented using numerous other architectures.

The servers described herein may include one or more computer systems that each include a processor, memory, user input and user output mechanisms, a network interface, and executable program code (software) stored in memory that executes to control the operation of the server. Various commercially available computer systems and operating systems software may be used to implement the hardware and software. The components of each server may be co-located or distributed. In addition, all or portions of the same software and/or hardware may be used to implement two or more of the functional servers shown. Thus, in some embodiments the components of FIG. 1 may be considered functional components that employ the same hardware and some of the same program code. Other embodiments may include different functional components. In addition, the present invention is not limited to a particular environment or server configuration.

The publisher web server 160 may comprise any web server hosting a website (comprised of one or more web pages) that includes a link (or other code) for requesting video content stored on the video server 120. When end users click on a link in one of the web pages (or when such web page is loaded), the client 170 sends a request for the associated video to the video server 120. In addition, a request for one or more advertisements (and/or customized video content for insertion into the video) may be sent to the ad server 100. In other embodiments, the requests for advertisements and videos may be sent to the same computer system or server. Alternately, the video server 120 may transmit a request for advertisements to the ad server 100 (e.g., on behalf of the client).

In this example embodiment, the ad server 100 may store, select, customize, and transmit advertisements as well as digital data (e.g., forms, images, video, audio, etc.) to the client 170 to be inserted into advertisements and/or video. Specifically, the ad server 100 may receive a request for advertisements and, in response, select one or more advertisements based on received (or determined) contextual data and transmit the selected advertisements (including interactive content). The requests may originate from a publisher's web server 160 (in response to a client 170 requesting a web page) or from a client 170 upon initiation or request of a video (e.g., a user clicking on a link to view a video or loading of a web page). The ad server 100 may request and receive information from the ad database 105 that may include contextual data, impression data, configurations setting, campaign criteria data, and/or other data for selecting an advertisement. The ad server 100 also may store data in the ad database 105. In addition, the ad server 100 may request and receive digital information (e.g., images, video, audio, etc.) from third party servers 521 to be inserted into a video to thereby customize the video or retrieve such digital information from memory. In one example, the ad server 100 receives the contextual information from clients 170 (directly or indirectly) and provides one or more contextual advertisement by selecting and/or customizing advertisements based on the contextual information.

The ad server 100 may then transmit the contextual advertisement(s) and/or content elements to the client 170. The ad server 100 may also transmit the control logic of the interactive content to the client 170. In other embodiments, the control logic is received at the client as part of the web page 505 from the publisher web server 160. The advertisement may include a form or other input mechanism for receiving information from the end user, which may be used by the ad server 100 or an application in the client 170 to provide additional contextual data to the ad server 100. When the user clicks on an ad, a request is transmitted from the client browser 170 to the advertiser's server 520, directly or indirectly. As illustrated, actuation (e.g., clicking) of the ad may cause the ad response to be transmitted first to a third party server 521 (e.g., a third party such as DoubleClick®) that provides tracking and other internet metrics for the advertiser and then the request is re-directed to the advertiser's server 520 (or any desired server), which may respond by transmitting the desired data file as shown.

An application on the end user's computing device (e.g., executing in the client), may generate and transmit contextual data and impression data, which includes information of the advertisement(s) that are displayed by the client 170. For example, data transmitted may include the date, time, information identifying the webpage in which the video or video link is embedded, information of the domain (e.g., the web site), information of the IP address (of the end user's computing device), user information (e.g., the location, address, sex, age, interests, hobbies, web pages previously viewed, domains visited, etc.) and other information such as information sufficient to determine whether a link (or form) associated with the advertisement was actuated. The impression data is received by the metrics server 130, which processes and writes the impression data to the ad database 105.

Control and sequencing (selection and play) of the videos and advertisements at the client may be accomplished via any suitable means in order to present the videos according to the design goals. In one embodiment, control and sequencing of the videos is accomplished by AJAX code embedded in the web page received by the client. In another embodiment control and sequencing of videos may be controlled by any combination of server-side scripting, AJAX, and Flash.

The video server 120 may store, select, and transmit a plurality of videos to the requesting client 170 in response to receiving a request for a requested video. How the videos are selected and sequenced may depend on the context in which the first video is requested. For example, if the first video is requested from a page on which other videos are displayed, the implied list may be played in a predetermined order. If a video channel is requested, other videos in that video channel typically will be sequenced (e.g., in a predetermined order or in an order of decreasing popularity or other user ranking). If the first video is requested from a page on which no other videos are displayed (e.g., from a third party publisher's web page), the primary channel associated with the requested video may be selected. One or more of these embodiments may require the client to provide the appropriate contextual playlist when a video is requested, and load the list into the video player for playback.

In yet another embodiment, the video server 120 may select the additional videos based on collected contextual information (in addition to or as alternate method for basing the selection).

The metrics server 130 receives responses to advertisements, stores various metrics in the ad database, and forwards data of the responses to the appropriate advertiser's web server 520, which transmits a data file to the responding client. The video player that presents the video may be transmitted from the publisher web server 160 as part of the web page 505, from the ad server 100, or from the video server 120.

Delivery of the streaming video and ads may be accomplished via any suitable method. Such methods may include push methods and/or pull methods of moving the advertisements and video content from the server(s) to the client. In addition, various videos of a sequence may be hosted by different servers so that the embedded code causes the client to transmit requests for the content to various different servers (and receives the content from the different servers).

Thus, the present invention provides for the syndication of video sequences and interactive content (e.g., for providing contextual advertisements and video) in that the video sequences and contextual advertisements may be published (to many clients) through numerous publisher web servers 160 (and websites) concurrently. In one embodiment, syndicating refers to the publication (e.g., distribution for presentation to the end users) of content (e.g., videos) in response to requests from clients (e.g., browsers, email clients, etc.) and wherein each request is received in response to a client execution of program code (e.g., resulting from user actuation of a hyperlink on a web page, loading of the web page into the client, loading of an email into a client, or other interaction with a web page, email, etc.) and where the plurality of clients receive their respective web pages (or emails or other content) from a plurality of different computers systems (e.g., web servers) and/or the web pages form parts of a plurality of different websites. Thus, the syndicated content is distributed to the end users from a computer system via a plurality of different third party servers such as web servers.

Example Embodiments

As discussed, the present invention provides a system and method for selecting and delivering sequential video content (sometimes also referred to herein as a "video") such as a plurality of videos and contextual advertisements (and additionally, in some embodiments, interactive content) in a packet based communication system such as the Internet. The videos provided may include the video requested by the client as well as a plurality of additional videos selected based, for example, on the requested video. In addition, in some embodiments, the additional videos may alternately, or additionally, be selected based on contextual information, information of the web page from which the request is provided, or some combination thereof.

The contextual advertisements may be presented in an interactive video "skin" (illustrated in FIG. 2) and comprise advertisements that are selected and/or customized based on information of the requested video, information of a selected video, or contextual information such as one or more of geographical information of the end user, demographical information of the end user, personal information about the user, technical information of the end user's computing device (and/or network), and/or other data related to the end user or client. As will be discussed in more detail, the advertisement may be selected or customized in any suitable manner such as by, for example purposes only, (1) providing information of venders local to the end user, (2) selecting advertisements that are targeted to the end user's demographics, (3) personalizing the advertisement (e.g., inserting the end user's name or photograph in the advertisement), (4) selecting scenery based on the end user's location or time, (5) sizing and formatting the advertisement according to the user's computing device, and (6) various other customizations. One or more videos also may be customized by inserting a product (i.e., product placement) targeted at the user, the user's demographics, and/or end user's location; personalizing a portion of the video (e.g., inserting a photo of the end user), personalizing text in the video (inserting the user's name on a marquee), and/or inserting audio content of the user in the video, or any other such customization. These selections and customizations are for example purposes only and the present invention is not limited to these examples.

Various types of contextual advertising may be presented to the end user. As discussed, advertising associated with video content may include advertisements that are displayed before the video content, concurrently with the video content (i.e., both the video (or video player) and the ad being present during overlapping time periods), between segments of the video content, and after the video content.

The video content is presented to the user by a video player, which comprises a software program that executes on the user's computing device. The video player of this example embodiment may allow the end user to hear audio content, hear and see video content, select and create channels, search for videos and/or channels, subscribe to a channel, and take other actions. In this example embodiment, the video player comprises a Flash application that executes within the existing browser window (client 170) along with the advertisements. In another example embodiment, a new browser (a pop-up) window is initiated and the video player is actuated and the player is disposed in the new browser with the advertisement, such as a video skin. The present invention, however, is not limited to a particular type of advertisement or video player. When one video finishes, an interstitial advertisement may be presented over the video player followed by presentation of another video in the video player. A different and new video skin advertisement may be displayed concurrently with the presentation of each new video.

Figure 5:
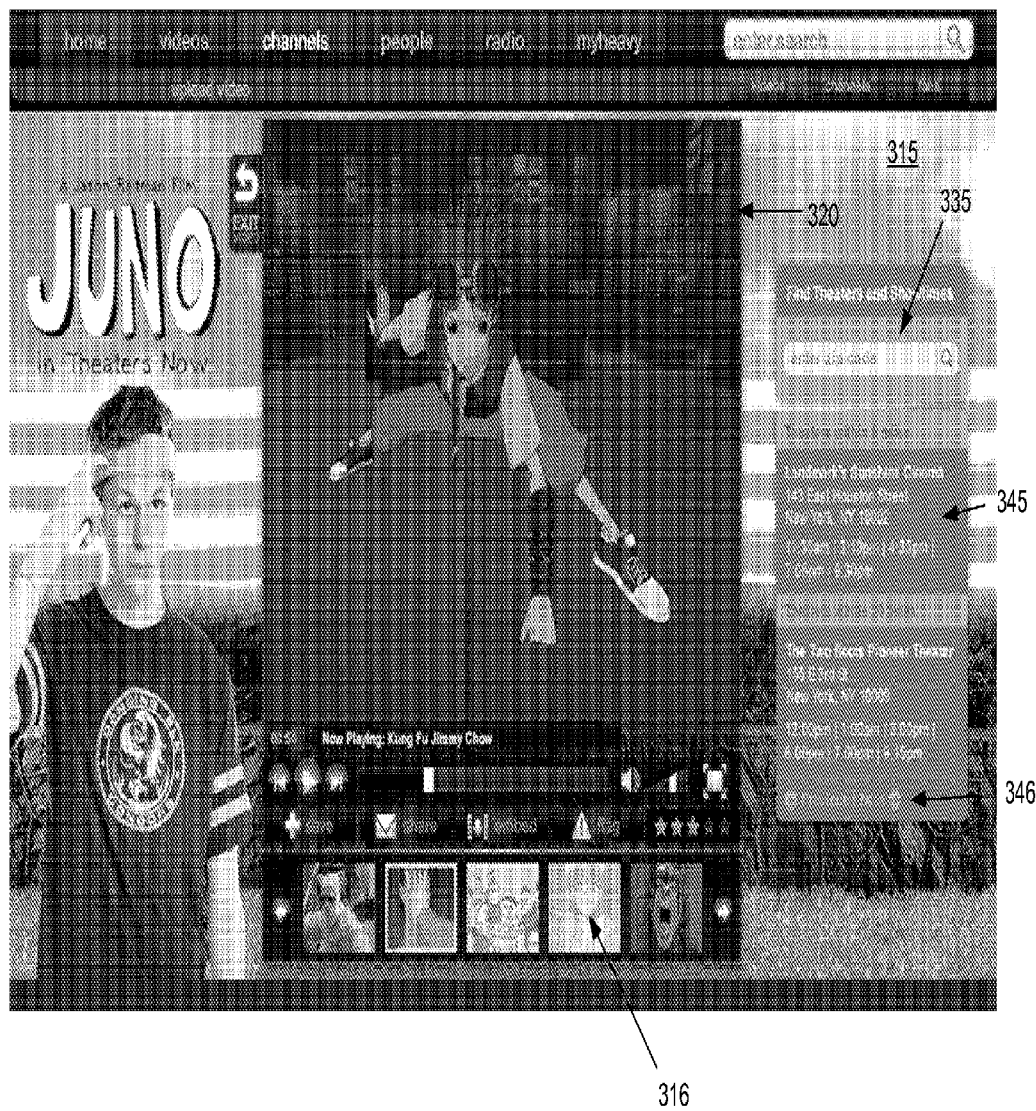
FIG. 5 illustrates an example of another video skin ad and video player in accordance with an example embodiment of the present invention.

In addition, as illustrated in FIG. 5, the video player of one embodiment displays a still image 316 (thumbnail) of the videos that are next to be played. A user may elect to skip any of the upcoming videos by clicking on the still image and hitting the delete button. The user may also elect to skip the video being played in the video player at any time.

Each type of advertisement may be configured to be displayed at a different time or location (relative to the video content) from other advertising types. The various advertising types may be of the same or different file type (e.g., jpeg, swf, flv, mpg, etc.). FIGS. 2-5 illustrate a first type of advertisement referred to herein as a video skin ad 315 that is configured to be displayed along a periphery of the video player 320 and, in some instances, concurrently with video content (the video content that is presented by the video player 320). The video skin advertisement 315 may comprise a gif, jpeg or other still image type or a flash or other rich media type, and may include an associated hyperlink (i.e., a click-through URL) and/or form for receiving information from the user and is discussed in more detail below. In this example, the video skin ad 315 extends around the entire perimeter of the video player 320. In other embodiments, the video skin 315 does not extend around the entire perimeter of the video player 320, but instead is adjacent each vertical side of the video player, 320, each horizontal side of the video player, or only one side of the video player 320.

Figure 2:
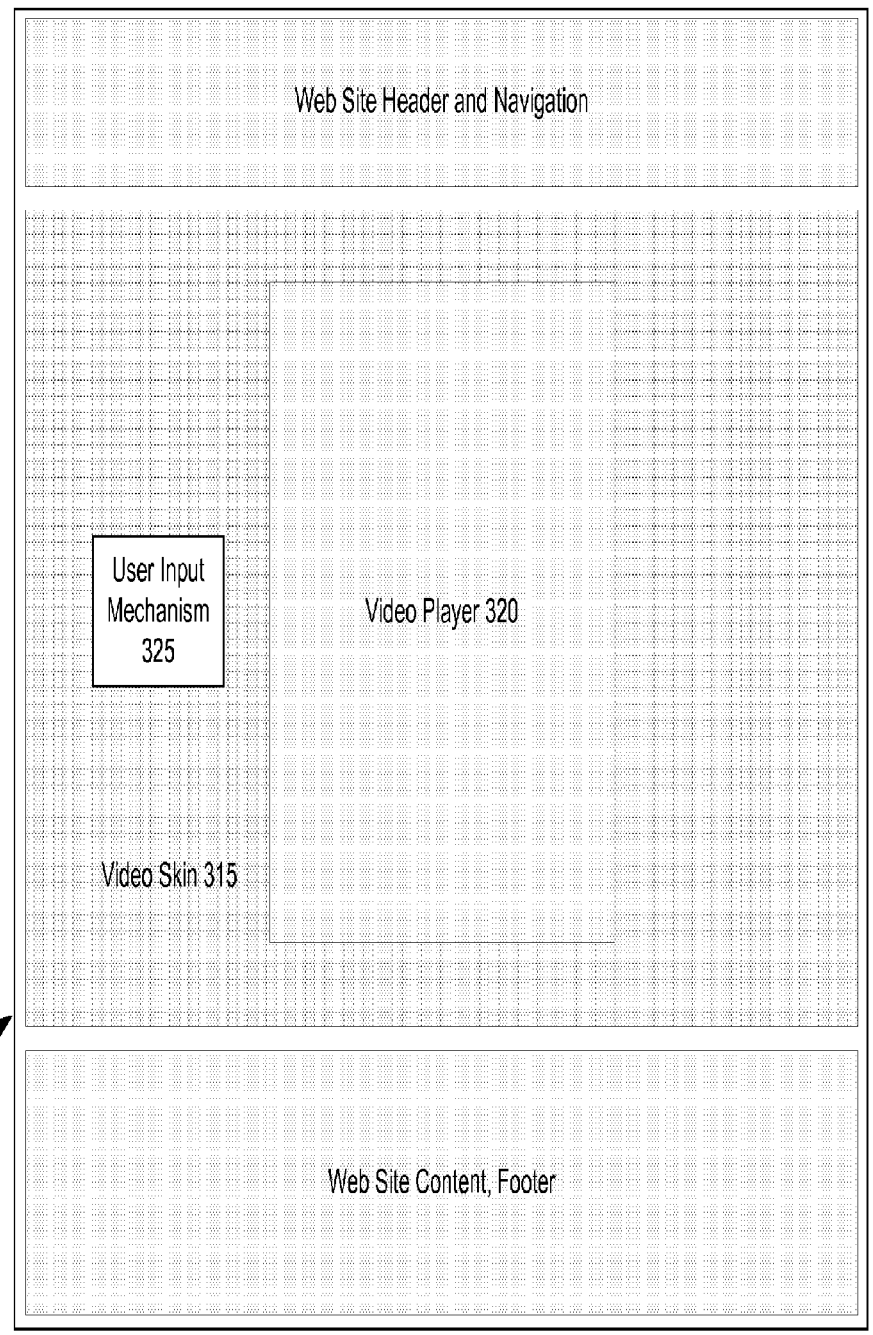
FIG. 2 is a schematic representation of an example video skin ad in accordance with some example embodiments of the present invention.
Figure 3:
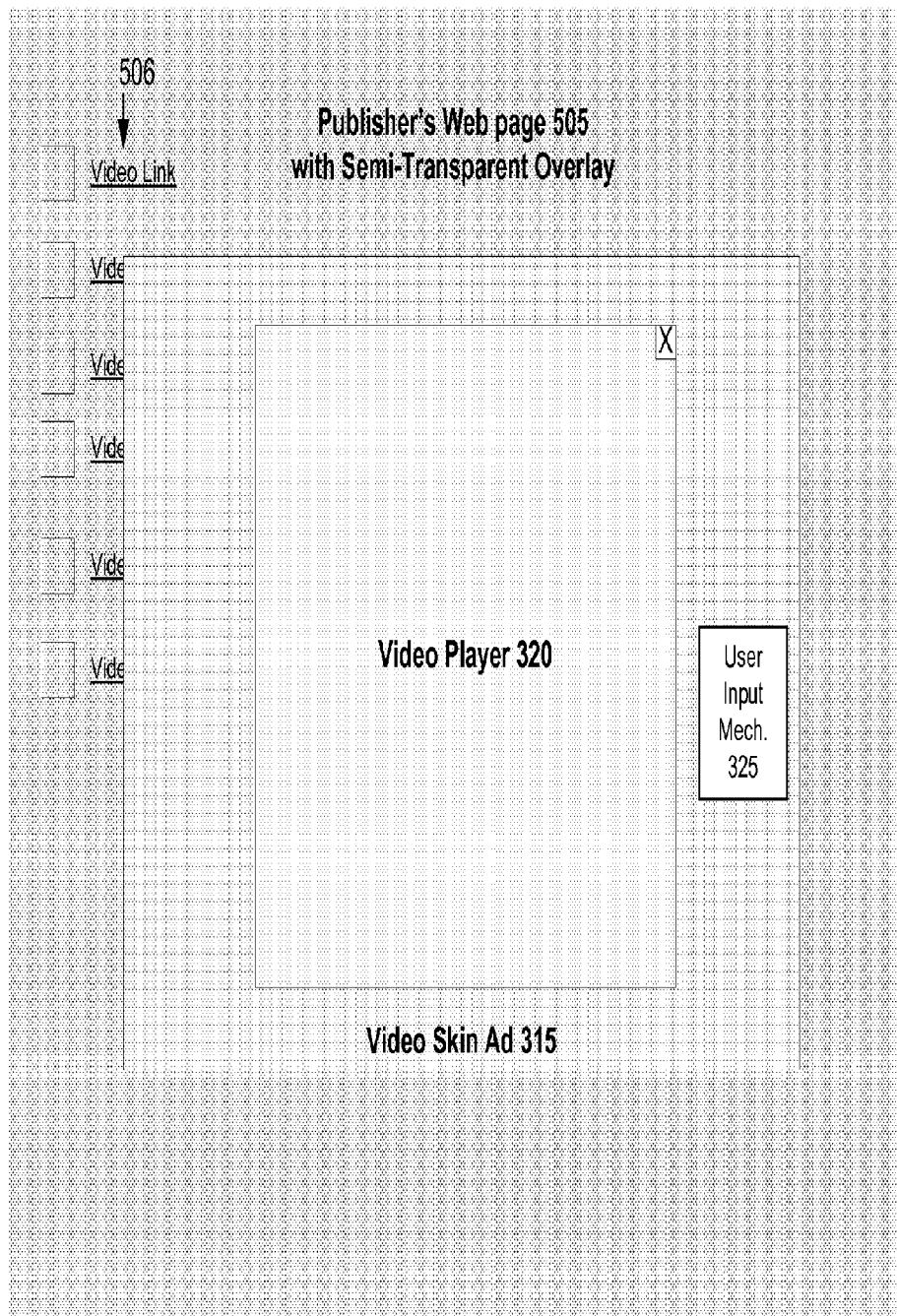
FIG. 3 is a schematic representation of another example video skin in accordance with some example embodiments of the present invention.

FIGS. 2 and 3 illustrate example embodiments of a video skin 315 that is presented with a video player 320. In one embodiment illustrated in FIG. 2, the video player 320 and video skin ad 315 may be presented in a new browser window 330 or new tab within the browser. Depending on the embodiment, the web page 505 that contains the hyperlink to the video, the video player 320, or an application in the browser window 330 presenting the advertisement (e.g., the control logic of the interactive content) may transmit a request for the video skin ad 315, transmit notification of the impression, and/or transmit notification of a click-through of the ad unit.

In another embodiment (and as illustrated in FIG. 3) the video skin ad 315 and video player 320 may be displayed over (in front of and partially obscuring) the publisher's web page 505. In other words, the video skin 315 and player 320 need not be presented in a separate browser window, but may displayed over the existing web page 505 (i.e., the web page 505 that includes the hyperlink 506 to the video content). In one example embodiment, the video player 320 and the video skin ad 315 may be presented as part of a flash application that initiates when the user clicks on the hyperlink 506 associated with the video. The flash application controls the display of the video player 320 over the video skin ad 315.

In yet another embodiment, the video skin ad 315 may comprise a piece of embedded "content" that is entirely independent of the video player and displayed above the player, in a separate layer. More specifically, the video player 320 and the video skin ad 315 may be displayed the topmost Cascading Style Sheet (CSS) layer of the publisher's web page 505. Depending on the embodiment, the video player 320 may be the publisher's proprietary player, a player service such as Brightcove®, or a third party embedded player 320, such as from YouTube®. In other embodiments, the displayed elements could also include a combination of "content" served from the publisher's web server and any of the above types of player. For example, the video skin ad 315 may appear in a CSS layer below a video player 320 in a window-like border (with a close box in the upper right corner) as illustrated in FIG. 3. In this example, the video player 320 could be received from any server, the border may be served by the publisher's web server, the video skin ad 315 may be embedded content from the ad server 100, and the web page 505 below the other elements may be served by the publisher's web server. The CSS layering of those elements is controlled by the logic (i.e., JavaScript code within the web page) served by the publisher's web server 160. Various other means of presenting the video skin ad 315 to the end user may also be used.

Referring to FIGS. 2 and 3, the video skin 315 may include a user input mechanism 325 that allows the user to input information or otherwise interact with the advertisement (and its associated control logic). The user input mechanism is shown schematically in FIGS. 2 and 3 and may comprise any suitable mechanism for obtaining the desired information including, but not limited to, one or more of text fields, text areas, check boxes, radio buttons, and/or drop down lists.

The video skin ad 315 may include an associated hyperlink that provides a click through to an advertiser URL so that if the user clicks a portion of the video skin ad 315, additional content (e.g., a form, a more detailed advertisement or other content) is presented. Specifically, in one example embodiment if the user clicks on the video skin ad 315, the client browser transmits a request to the advertiser's server (or, alternately, a third party server) for a data file, which (depending the advertiser, the link, and other factors) may be an HTML page (i.e., a web page), a video, a flash animation, an audio file, and/or other content. The content of the data file may include (1) an offer to provide more information, for example, including a form to allow the user to provide his or her personal information such as name, address, email address, phone number, etc.; (2) additional information about the advertiser's product or service; (3) a request that the user purchase of a product or service (e.g., additional information with a "buy now" link); (4) a request for payment (e.g., a form to allow the user to provide credit card information); (5) an offer to download content; or (6) some combination of these. The data file may be presented in the video skin or in a new browser window. In addition thereto or alternately, the video skin ad 315 may display a user input mechanism for supplying additional information to, for example, purchase a product or service, request additional information (e.g., related to the video), or otherwise interact with the video skin (and/or advertiser). A new video skin ad may be presented each time a new video is presented and each new ad may be selected based on the video with which the ad is to be concurrently presented.

Figure 6:
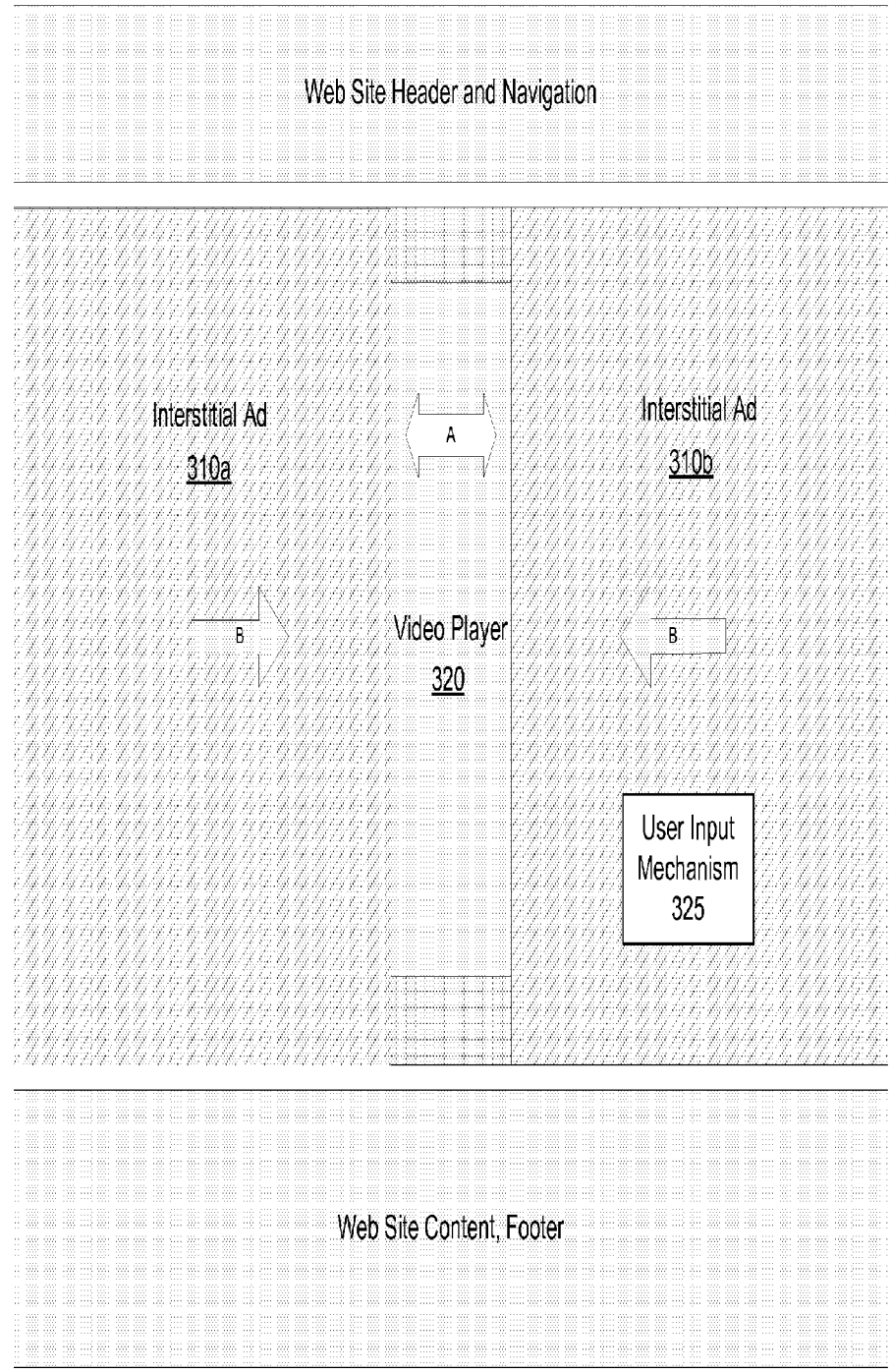
FIG. 6 is a schematic representation of an example interstitial advertisement in accordance with an example embodiment of the present invention.
Figure 7:
FIG. 7 illustrates an example interstitial ad and video player in accordance with an example embodiment of the present invention.

A second type of advertisement is an interstitial advertisement that may comprise one or more images (static or video) that are displayed prior to (or after) a video (e.g., which includes between videos) and that split apart into multiple portions just prior to the beginning of the video content (or come together just after the end of the video content), and may act as a pre-loader while the upcoming video is buffered or transmitted. Referring to FIGS. 6 and 7, one example interstitial advertisement, a jpeg image (although other embodiments may include one or more jpeg, gif, mpg or other files) separates along a vertical line in a manner that is similar to two doors sliding apart to reveal the beginning of the video content. The interstitial advertisement also may include audio content. The arrows in FIG. 6 illustrate the movement of the interstitial ad of one example embodiment. Specifically, the Interstitial ad may comprise a sliding-door style ad that opens (as indicated by arrow A) such as, for example, at the beginning of the video (or prior to presentation) and to reveal the video player and video. When the interstitial ad finishes opening, it may no longer visible in some embodiments (e.g., and, in some embodiments, may open to reveal a video skin ad 315). In addition, when presentation of the video is complete, the doors 310*a,b* of the interstitial ad 310 may come together to close completely (as indicated by arrows B), followed by another interstitial ad and the next video. The Interstitial ad 310, while wholly visible or partially visible, (either at the beginning or after the video presentation) may provide a click through to an advertiser URL so that if the user clicks on any portion of the interstitial ad the advertiser's content is presented and/or a user input mechanism 325 (e.g., form inputs) to allow the user to supply information. FIG. 7 provides an example of such an interstitial ad 310 that has begun to separate into two portions 310*a* and 310*b*. When the user clicks on the interstitial ad or submits a form in the interstitial ad, the client browser transmits a request to the ad server 100 (or, alternately, the advertiser's server or a third party server) for a data file, which (depending the advertiser, the link, and other factors) may be an HTML page (i.e., a web page), a video, a flash animation, or other content. One or more interstitial ads may be presented between each pair of sequenced videos.

A Pre-roll advertising type comprises an advertisement (e.g., video or still image) that is presented to the viewer just prior to the beginning of the video content and may include an associated hyperlink to the advertiser and/or a form. Thus, the interstitial ad 310 may form one type of pre-roll advertisement. While not included in this example embodiment, other implementations may further include a post-roll advertising type, which may comprise a video (or still image) that is presented to the viewer at the end of the video content (which an interstitial ad that closes may comprise one example). In addition, other implementations may further include one or more mid-roll advertisements that comprise a video (or image) that is presented to the viewer at one or more cue points (location and/or time) in the middle of the video content (between segments of the video). The various ads types may be controlled by the same or different control logic.

The following example is described in the context of a video skin ad 315. However, the invention is equally applicable for use in other ad types including a pre-roll ad, a post roll ad, or a mid-roll ad (any of which may comprise an interstitial ad or other ad type).

Depending on the embodiment, the present invention provides a method of providing a sequence of videos and contextual advertisements. As discussed, the contextual advertisements (and in some embodiments the additional videos) may be selected, at least in part, based on contextual information collected by interactive content that may comprise a programmable object (e.g., an application) that contains control logic (e.g., program code that executes rules according to business logic) that executes on the end user's computing device (e.g., in a client browser 170). The logic may have access to one or more of the (1) geographic location information of the end user, (2) demographic information of the user, (3) information about the video (e.g., cue points for inserting data, subject matter type of the video, rating of the video), and (4) technical information (e.g., about the end user's computer or the network to which the computer is connected). In other embodiments the logic may have access to different and/or additional information. The contextual information may be determined, retrieved, or received via a backend database (e.g., the ad database), HTTP (HyperText Transfer Protocol) values (e.g., IP address, variable, parameters, status codes, data in headers, etc.), and/or Internet media-type tags (sometimes referred to as Multipurpose Internet Mail Extensions (MIME) tags—content type, type of device, from browser). An Internet media type, also sometimes referred to a Content-type, is a two-part identifier for file formats on the Internet. An internet media type is composed of two or more parts: a type, a subtype, and one or more optional parameters.

Figure 8:
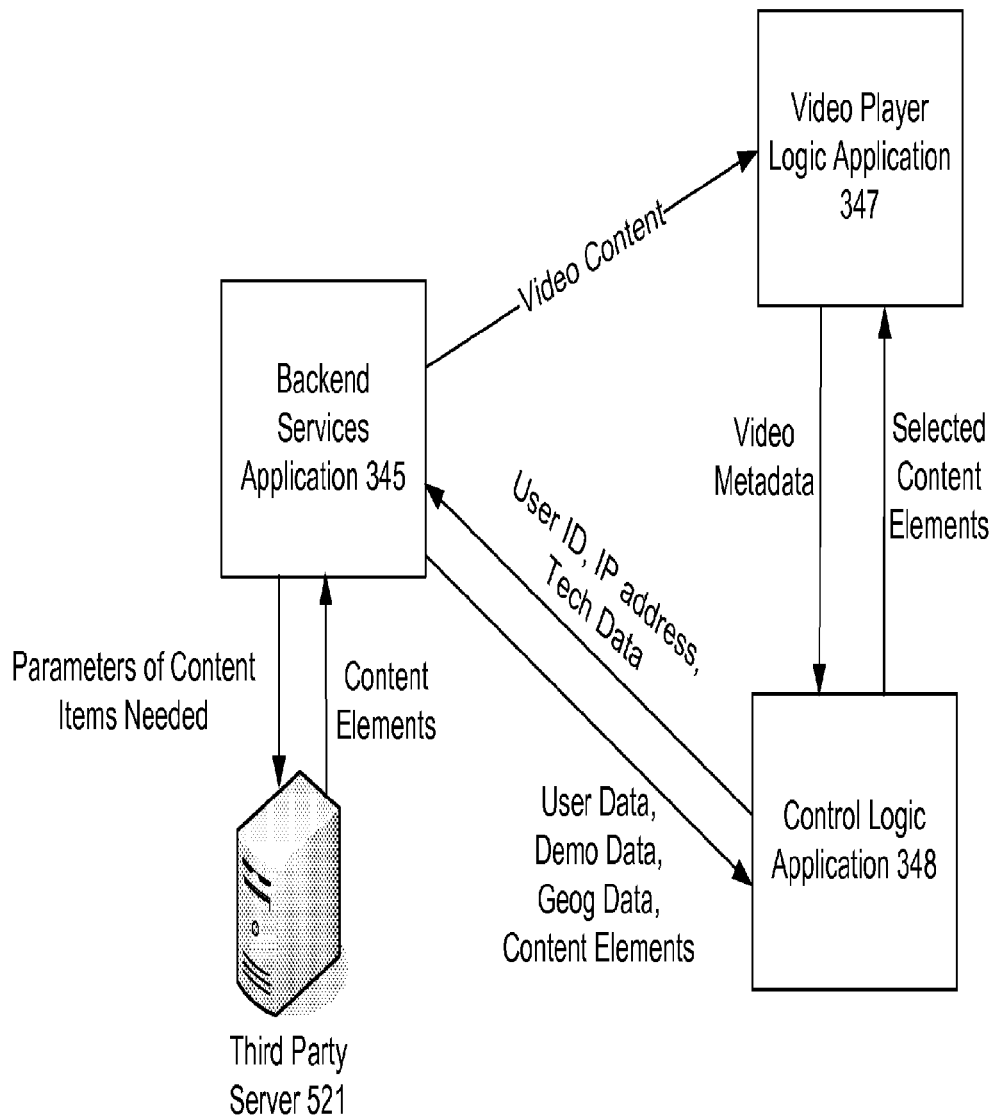
FIG. 8 provides a functional block diagram of a system for implementing an example embodiment of the present invention.

In one embodiment, the present invention may be implemented via three applications that perform separate logical functions as illustrated in FIG. 8. First, a backend services application 345, which may reside on the ad server 100, video server 120, (or other remote computer), communicates with third party servers and transmits data to the control logic application 348. For example, the backend services application may provide parameters of the advertisement content needed to third party servers, receive advertisements meeting those parameters, and transmit some of the received advertisements to the control logic application 348. Second, a video player logic application 347, which may execute in the browser 170, communicates data between the backend services application 345 and a control logic application 348. The video player logic application 347 may form part of, or communicate with, the video player 320 (that plays the videos) and may communicate video metadata (e.g., video cue points, acceptable content elements, subject matter type of the video, etc.) to the control logic application 348. More specifically, the video player logic application 347 may provide "cue points" to the control logic application 348 including (1) the spatial location, duration, timing, and/or size of a text, graphic, image or video insertion, (2) the type of information acceptable for insertion (e.g., as identified by well known values, subject to future standardization). For example, a video may permit insertion of an image of a standard size (e.g., 90×128), to promote a product. The video player logic application 347 also may request information such as a "client name," "client location," "phone number," and other such information (e.g., to be integrated into the video). Such information and requests may be provided to the control logic application 348.

Finally, the control logic application 348, which may comprise a JavaScript application that executes in the browser 170, communicates with the backend services application 345 and the video player logic application 347. For example, the control logic application 348 may use the above mentioned cue points to retrieve information from a third party server (e.g., via the backend services application 345 or directly) or the ad server 100, the video server 120, and then insert the digital information into the video by communicating with the video player logic application 347. Depending on the embodiment, the control logic application 348 or the video player logic application 347 may request additional videos and advertisements as the play of the sequence of videos (and presentation of the advertisements) progresses. The schematic of FIG. 8 illustrates one embodiment and examples of some of the types of data that may be communicated. However, in some embodiments at least some of such data need not be communicated to and from the backend services application 345 and, instead, the control logic application 348 includes logic, data, and content elements (received upon loading or stored on the end user's computing device) sufficient for customizing the advertisement and/or video.

Figure 4:
FIG. 4 illustrates a schematic representation of an example video skin ad and video player in accordance with an example embodiment of the present invention.
Figure 9:
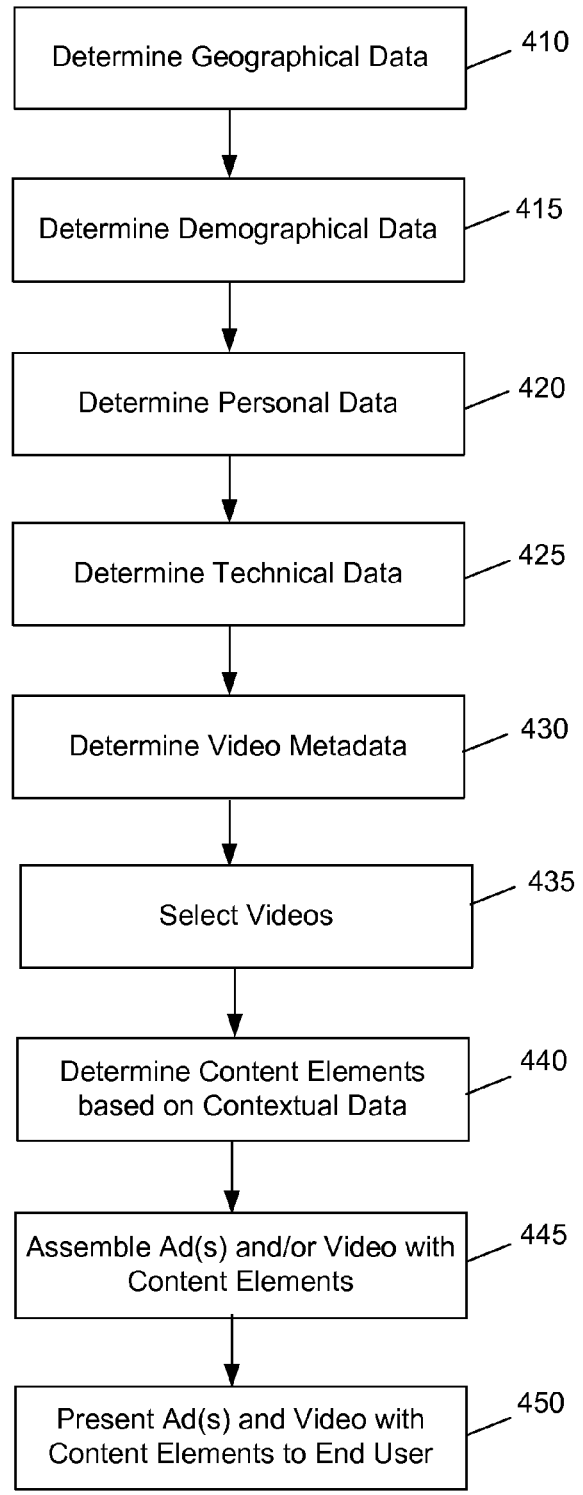
FIG. 9 provides a flow chart for implementing an example embodiment of the present invention.

FIG. 9 provides a flow chart of the processes that may be performed in an example system and method. At step 410, geographical data may be determined, for example, based on the IP address of the end user's computing device. More specifically, the control logic application (CLA) 348 may obtain the IP address (or a User ID from a cookie) of the end user's computing device and transmit the IP address (or User ID) to the backend services application (BSA) 345 or other remote computer. In response, the BSA 345 (or the other remote computer) may transmit a zip code (or address) or other geographical data back to the CLA 348. Alternately, the CLA 348 may present a form 335 in the video skin 315 that requests the user's zip code (as illustrated in FIG. 4) or other information. The user may then supply the zip code (or other geographical information) via the video skin ad 315. Alternately, location information (e.g., a zipcode) may be stored in a cookie on the end user's computing device that is retrieved by the CLA 348.

At steps 415 and 420 demographical data and personal data, respectively, may be determined by the CLA 348 via a form into which the user supplies information. Alternately, or in addition thereto, the CLA 348 may retrieve information identifying the end user (e.g., a user ID) from a cookie stored on the end user's computer and transmit the user ID to the BSA 345. Using the user ID, the BSA 345 may then access the database to retrieve demographic and/or personal information that has been previously supplied by the end user or otherwise determined. Alternately, some demographical data (e.g., user's gender) and personal data (e.g., user's first name) may be stored in a cookie on the end user's computing device that is retrieved and used by the CLA 348.

The CLA 348 may determine technical data at step 425, which may include information about the end user's computer or the network to which the end user's computer is connected via the client browser 170. For example, the CLA 348 may determine the type of computing device, the browser (and version), the operating system, and other data. Such data typically is readily available via program code in the browser 170 as is known to those skilled in the art.

At step 430, the CLA 348 may receive data about the requested video (video metadata) from the video player logic application 347. The video metadata may include one or more of the video's rating, the subject matter type of the video (e.g., cars, extreme sports, sports, comedic, etc.—identified via tags), accepted content types for customization of the video (e.g., audio, video, still images (such as jpeg), etc.), cue points of the video, sizes of content elements, and other parameters and data related to the video. In other embodiments, video metadata of the requested video may be determined (e.g., previously stored and then retrieved from memory) by the video server 120 upon receiving the request for the video.

It is worth noting that in some instances, some of steps 410-430 may be omitted. For example, if the video is being played in a video player that does not provide video metadata, step 430 may be omitted. If the user's computing device is configured to prevent the storage of cookies, step 415 and/or 420 may be omitted. In addition, the sequence of processes 410-430 may be arbitrary and, depending on the embodiment, may be performed in any order or concurrently. In addition, in other embodiments the system may use other data or only some of this described data for providing contextual advertisements, selecting videos, and/or customizing the video.

At step 435, the BSA 345 (e.g., at the video server) selects one or more additional videos to be provided to the client. The BSA 345 may select the one or more videos based on the, for example, information about the web site (e.g., its demographics) that the web page containing the hyperlink that the user actuated to request the video. Alternately, the BSA 345 may select the one or more additional videos based on contextual information (e.g., personal data of the user, or demographical data). Thus, the one or more additional videos may be selected based on any combination of (1) information of the requested video (e.g., the subject matter of the content (such as the content category), channel, rating, etc.); (2) any contextual information; and (3) the web page from which the request is initiated. In one embodiment, a first set of videos is selected and transmitted. In some embodiments, as the video player progresses through the requested video and the initially selected videos, a request for additional videos may be received (e.g., from the player or CLA), which results in additional videos being selected and transmitted to the video player.

At step 440, the system determines the one or more content elements to be used to customize the advertisement(s) and/or video(s). This process 440 may include selecting—based on the data collected from any of steps 410-435—one or more existing content elements from a plurality of content elements stored in memory. A content element may comprise an advertisement, a still image that may form a portion of an advertisement or video (i.e., be inserted into the video), an audio file that may form part of an advertisement or the video, or a video clip that may form part of an advertisement or the video. This process 440 also may include constructing content elements such as by creating a customized still image (such as cropping and formatting a photo of, or from, the user or constructing an image with the user's name), processing a video supplied by the user, or processing an audio file supplied by the user. In addition, the process 440 may include requesting and receiving content elements from third party servers. Depending on the embodiment, this process 440 may be performed by the CLA 348 (i.e., on the end user's computing device), by the BSA 345 (remote from the end user's computing device) or some combination of both. In some embodiments, this step may be omitted. In some embodiments, this process 440 may simply comprise selecting the advertisements. In one embodiment, an interstitial ad is selected to be presented prior to the start of each of the plurality of videos (i.e., the requested video and selected videos). In addition, a different video skin ad may be selected to be presented concurrently with each of the plurality of videos (i.e., the requested video and selected videos).

At step 445, the CLA 348 (and/or BSA 345) assembles the advertising (if necessary) to provide contextual advertising and/or customizes the video with the content elements (determined in step 440). For example, some content elements may be selected (or constructed or received) by the BSA 345 (at step 440) and transmitted to the CLA 348, which inserts some of the received content elements into an advertisement in the video skin ad 315. In addition, some of the determined content elements may be provided to the video player logic application 347, which inserts the content elements into the video according to the corresponding cue points to thereby customize the video. In some embodiments, this process 445 (assembling) may be a logical function performed when the advertisement and/or video is presented at step 450.

At step 450, the videos are sequentially presented to the user in the video player along with the contextual advertisements. An example is shown in FIG. 5 in which, in response to receiving a zip code supplied by the end user, the BSA 345 transmits data of the theaters within five miles of the supplied zip code and the CLA 348 presents the received data in the video skin ad 315. Example implementations of these steps are provided below. In addition, the requested video is presented in the video player 320 and the sequence of videos to be presented are shown as thumbnail still images 316.

In summary, by determining contextual information (e.g., geographic, demographic, personal, technical information of the user, and video metadata) the system can provide a sequence of videos and contextual advertisements and may further customize the advertisement(s) and/or video(s) based on the contextual data. Such customization may include, but is not limited to: (1) utilizing the geographic and/or demographic information to select appropriate images and/or advertisements to be presented by the video skin 315 (or video player in the video); (2) using geographic information to customize (e.g., personalize) the images, language, and form of the ad; (3) choosing a form, text, image, or video based on the machine, operating system, browser, television, or network used by the user viewing the video; (4) selecting and/or modifying advertising content elements and/or content elements to be inserted into a video based on contextual data; or (5) some combination thereof.

The CLA 348 may use one or a combination of methods to customize content for the end user. For example, the video skin 315 may personalize the images, language, and/or other content and/or select images, videos and/or other content by (1) sending a request for appropriate advertising content (e.g., a request for an image, form, video, and/or language text); (2) sending a request for a particular type of image, form, and/or video; (3) selecting one or more of a plurality of images, forms, videos, language texts that are sent with (or to) the CLA 348 (as part of the video skin and/or video player); (4) via another suitable method; or (5) some combination thereof.

FIGS. 4 and 5 illustrate an example implementation of the present invention for providing contextual advertising in a video skin. Referring to FIG. 4, an end user has clicked on a link to view a video (an animation) that is depicted in the video player 320. The video skin ad 315 is shown presenting a contextual advertisement that comprises an advertisement for a movie, Juno®. In this example embodiment, the advertisement 333 has been selected based on the content of the video (an animation) because it is likely that an end user who is interested in the animated video may be a target market for the movie Juno. The video skin ad 315 also includes a form 335 that allows the end user to supply a zip code in order to find nearby theaters that are showing the movie Juno. When the user enters a zip code and submits the form 335, the CLA 348 transmits the zip code to the BSA 345 (or other remote server), which responds with information of the theaters near the zip code that are showing Juno. Upon receipt of the theater information, the CLA 348 causes the video skin ad 315 to display the theaters 345 as is illustrated in FIG. 5. As is evident from the bottom of the theater information, the video skin ad 315 also displays navigation buttons 346 to allow the user to page through additional lists of nearby theaters showing the movie. In addition, in an alternate embodiment, the CLA 348 may cause the video skin 315 to display a form for purchasing tickets to the movie at a theater selected by the end user. Thus, the video skin ad 315 interacts with the end user. In other implementations, an advertisement for a particular type of automobile (e.g., Nissan®) may be presented as the video skin ad 315 (e.g., because the video relates to automobiles) with a form 335 used to supply a zip code that is subsequently used to determine and provide the nearby dealerships offering the particular type of automobile. In other embodiments, the form 335 may be used to collect information from the user such as the user's email address, phone number, name, home address, profession, and other personal or demographic information.

As discussed, the CLA 348 may be configured to customize the video by providing digital information from third party servers to the video player logic application (VPLA) 347 for insertion into the video at specified cue points, which may result in modification of the video being presented to the end user. In this way, the CLA 348 may facilitate customization of the video. The cue points of a video comprise time points within a video and may be tagged with type of content element that is expected (e.g., image, audio, video, text, etc.). Thus, the video customization feature may be used to provide product placement within the video content (e.g., a car, can of soda), placement of user generated content in the video (e.g., photos, videos and/or voices), placement of background scenery based on the time of day and/or geographical location (e.g., an early morning sunrise in Manhattan, N.Y. or a night time skin in Los Angeles, Calif.), placement of custom messages in the video (such as placing the user's name on the marquee of a cinema within the video), and other such customizations.

The CLA 348 may use any suitable method of providing the digital information from the third party server to the video player. In one example, the CLA 348 uses a communication channel between the video player 320 and the web browser 170. With a Flash video player, for example, the CLA 348 may use an ExternalInterface call that binds JavaScript to functions in Flash.

As an example, the CLA 348 may provide a request to the video player logic application 347. The request may include a request for one or more of the video's rating, the subject matter type of the video (e.g., cars, extreme sports, sports, comedic, etc.), accepted content types for customization of the video (e.g., audio, video, still images (such as jpeg), etc.), cue points of the video, and other parameters and data related to the video (collectively referred to herein as video metadata). In response, the video player logic application 347 may supply all (or some) such information to the browser logic application 348. In addition and as discussed above, the CLA 348 also may determine (or receive via the browser 170) information identifying the type of computing device (e.g., mobile telephone versus notebook computer), the browser type, user and/or demographic information (e.g., received from a backend database based on a user ID from a cookie stored on the user's computing device), geographic information (e.g., based on information in a cookie, the IP address of the computing device, or zip code supplied by the end user), and other information (e.g., such as information supplied by the user via a form in the video skin ad 315).

Upon obtaining such information (from the video player logic application 347, via the video skin 315, and/or the browser 170) the control logic application 348 may then transmit all or a portion of the information to the backend services application 345. Upon receiving the information, the backend services application 345 may determine information about the end user. For example, the IP address may be used to determine the general location of the end user. In addition, based on information identifying the end user (e.g., retrieved by the browser via a cookie), the backend services application 345 may retrieve from memory user information (e.g., demographical information) previously supplied by the end user. Based on the received information and information determined by the backend services application 345, the backend services application 345 may then select, retrieve content elements (e.g., images, video, audio, etc.) from memory, and (in some instances) customize the retrieved content elements. In addition, or alternately, the BSA 345 may then transmit a request for digital information (e.g., content elements of images, video, audio, etc.), subsequently receive digital information from one or more third party web servers, and in some instances, customize the received digital information. The backend services application 345 then transmits the retrieved and/or received content elements to the control logic application 348. The BSA 345 may also use the determined contextual information to select the additional videos.

Upon receipt of the data from the backend services application 345, the control logic application 348 may supply some information (such as some of the received content elements or other data) to the video player logic application 348 to, for example, be integrated into the video (to thereby customize the video) for viewing by the end user. In addition (or alternately) the control logic application 348 may present data (such as some of the received content elements or other data) to the user in the video skin ad 315 such as, for example, to provide a contextual advertisement in the video skin (e.g., a list of local cinemas that have a particular movie).

The control logic application 348 may also include subordination logic to ensure that the video skin ad 315 does not annoy or distract an end user who is watching and listening to a video. For example, the application 348 may include logic for limiting animation, ensuring colors do not flash, vibrate, and ensuring that the video content is not obscured with highly saturated images (e.g., bright reds, yellows, polka dots). In addition, the CLA 348 may control the video skin 315 by, for example, (1) pausing a video that is embedded in the video skin when the video content is playing unless it is activated by the user; (2) muting audio content that is embedded in the video skin 315 when the video content is playing unless it is activated by the user. The CLA 348 may request and receive information from the VPLA 347 in order to determine when to pause a video, mute the audio, darken colors, reduce animation, and perform other controls of the video skin ad 315. In addition, when the user interacts with a video skin ad 315 (e.g., by clicking on a link or entering data into a form), the CLA 348 may provide control messages to the VPLA 347 to pause the video. The video may remain paused until the user clicks the play button of the video player 320.

Also, because there are different types and sizes of video players 320, the CLA 348 may configure the ads (e.g., adjust to the size of the video player 320), or may be transmitted in a format and size that is appropriate for the video player 320. The video skin ads 315 may be displayed while the video player is displayed (e.g., for substantially the same time period), may be removed from the display before the video player 320 is removed, or may continue to be displayed after the video player 320 is removed for a predetermined time period or until a triggering event (e.g., a user actuation to close the video ad 315). Similar to the video skin ad 315, the interstitial ads 310 may be displayed in a separate CSS layer of the web page (e.g., in front of the video player), under control of a flash application, or via other suitable mechanisms.

Figure 10:
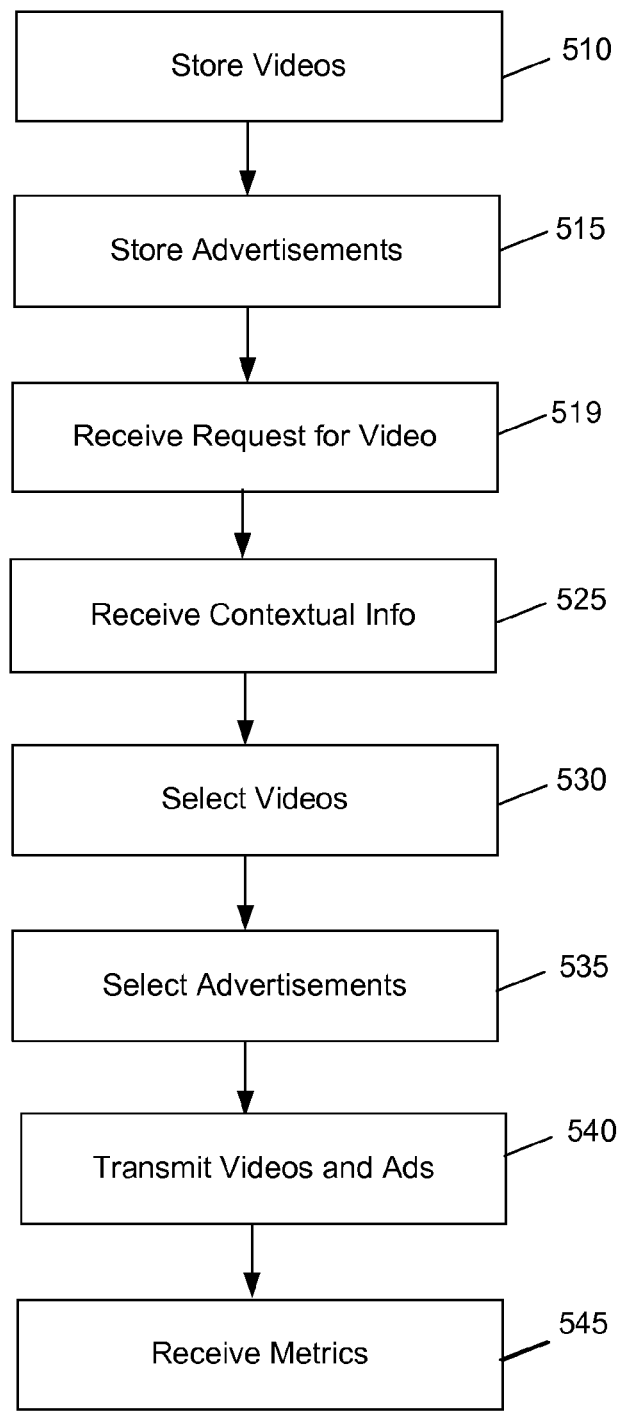
FIG. 10 provides a flow chart for implementing another example embodiment of the present invention.

FIG. 10 illustrates an example method of providing sequential video and contextual advertisements at a server according to an example implementation of the present invention. In this example, the server stores a plurality of videos in memory at step 510. These may include videos provided by the public, the system operator, or third parties. The same server (or another server) stores a plurality of advertisements in memory as indicated by step 515.

In this embodiment, a plurality of third party web sites contain web pages that include hyperlinks directed to one or more of the plurality of videos stored on the server. As discussed, the hyperlinks typically are embedded in the web page by the operator of the website. When a user clicks on such a hyperlink in a web page (or when the page is loaded), a request for the specific video identified by the hyperlink is sent to the server. At step 519, the server receives a request for the specified video. In addition, clicking on the hyperlink may initiate a software application on the user's computing device (e.g., CLA) that initiates the video player and configure presentation of the videos and display of the still images 316 representing the next five videos to be presented.

In some embodiments, the request may include contextual information as described above. In other embodiments, the server may request and, subsequently receive the contextual information. In still other embodiments, the contextual information may be received when retrieved from memory (e.g., retrieving information about the user upon receipt of a user ID from a cookie). In these embodiments, the contextual information is received at step 525. In other embodiments, the system may not employ contextual information. For example, if the first video is requested from a page on which other videos are displayed, the implied list will play in a predetermined order. If a video channel is requested, other videos in that channel may be selected (e.g., in a predetermined order or in an order of decreasing popularity or other user ranking). If the first video is requested from a page on which no other videos are displayed (e.g., from a third party publisher's web page), the primary channel associated with the requested video may be selected (such information may be stored in memory at the server). One or more of these embodiments may require the client to transmit the appropriate contextual playlist when a video is requested, and transmit the identified videos to the video player for presentation to the end user.

At step 530, the server selects one or more additional videos for transmission to the requesting client. As discussed, the selection may be based on information of the requested video. In one example, video metadata about the video may be retrieved from memory to select the additional videos. In addition, information about the web page (including the website) containing the hyperlink from which the request for the video was initiated may also (or alternately) be received and used to select the one or more videos. For example, if a user selects a ski video from a news based website (e.g., CNN.com®), a first group of additional videos may be selected such as videos about various travel destinations or family oriented skiing videos. The advertisements selected (based on the news website and the ski video) may be directed to ski travel destinations. Alternately, if the user selects the same ski video from a web site related to outdoor activities, videos containing subject matter related to outdoor activities (e.g., hiking, canoeing, kayaking, etc.) or extreme skiing videos may be selected. The advertisements selected (based on the outdoor website, the ski video, and/or the extreme skiing video) may be directed to ski boots, skis, or ski clothing. Thus, the same user may receive different videos and advertisements when selecting the same video from different websites.

As discussed, the selection of the additional videos and advertisements may be based on both contextual information and information of the web page from which the request was initiated. Thus, as another example, if a first user selects the snow skiing video from a news related web site and the contextual information indicates that the user is presently in a location having a cold climate, videos containing outdoor activities in cold climates may be selected. Similarly, advertisements may be selected for the first user that include products based on the user's location, the video selected, and the website and may be, for example, advertisements directed to warmer travel destinations or products for use in cold (and outdoor) climates. In addition to being selected based on the user's location and the selected video, the selection of the ad may be based on the demographics of users who visit news related websites (e.g., who may be more likely to be interested in such advertised products).

If a second user selects the snow skiing video from the same web site and the contextual information indicates that the user is presently in a warm climate, videos containing outdoor activities in warm climates may be selected such as videos directed to hiking, kayaking, and such. Similarly, advertisements may be selected for the second user that include products based on the user's location, the video selected, and the website and may be, for example, advertisements directed to products used in warmer travel destinations by outdoor enthusiasts (e.g., roller blades, bicycles, swimming gear, etc.). In addition, advertisements directed to local venders, or for products available locally may be selected (e.g., be preferred for selection based on the contextual data).

At step 535, the server selects the advertisements based on the contextual information, the requested video, and/or the selected videos as described above.

The server then transmits the requested video, the selected video(s), and the selected advertisements to the client at step 540. Upon receipt, the video player (e.g., of the client) presents the requested video to the user and may display a thumbnail image of the additional selected videos. In addition, the received advertisements may also be presented as video skin ads and/or interstitial advertisements (e.g., before, between, and after each video). In some embodiments, (e.g., when numerous videos have been selected) only a portion of the selected videos (and advertisements) are transmitted (although their thumbnails may be transmitted) in order to conserve bandwidth. For example, although ten videos may be selected, only the first five may be initially transmitted. In this example, when the video player finishes playing the first video (or when the second video starts to play) a request for another video and advertisement(s) may be sent to the server which responds with the next video and ad set. Consequently, if the user elects to discontinue watching the video sequence, only a few videos will have been transmitted without being viewed.

At step 545, the server receives metrics that comprise information on the number and identity of advertisements responded to by end users, the number and identity of videos viewed by end users—all of which can be used to improve the selection processes.

The present invention has been described in the context of syndicating the delivery of contextual advertisements and sequenced video content to a plurality of clients via the internet. However, it is equally well suited for syndicating interactive content for providing contextual advertisements and/or customized and sequenced video content via a plurality of mobile telephone networks (or a combination of the internet and mobile telephone networks) wherein the content is presented on wireless mobile telephones or other portable communication devices.

Examples of systems for delivering ads and various types of ads such as, for example, video skin ads, interstitial ads, Top Bar Marquee, Channel Sponsorship, Pre-roll, post roll, Radio Channel Sponsorship, Radio Banner, Radio Trailer and other ads—all of which may be employed with various embodiments of the present invention—are provided in U.S. patent Ser. No. 11/750,665 filed on May, 18, 2007, entitled "System and Method for Providing Advertisements for Video Content in a Packet Based Network" incorporated by reference above. However, the present invention is not limited to the types of ads or delivery systems disclosed herein.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

What is claimed is:

1. A computer implemented method comprising:
receiving a request for a first video from a user device;
determining user data for the user device;
determining advertising content based on the user data;
determining contextual data for the first video;
determining a plurality of videos based on the contextual data;
determining, based on the contextual data, a presentation order from among a plurality of possible presentation orders for presenting the first video and the plurality of videos;
transmitting the first video and the plurality of videos to the user device for automatic sequential presentation of the first video and the plurality of videos based on the presentation order; and
transmitting the advertising content to the user device for presentation with the first video and the plurality of videos.

2. The method of claim 1, wherein the user data comprises at least one of geographical information for the user device, demographical information for a user of the user device, technical information for the user device, and personal information for the user of the user device.

3. The method of claim 1, wherein determining contextual data comprises determining at least one of a web site on which the request for the first video was generated, a subject matter of the first video, a channel associated with the first video, and a rating of the first video.

4. The method of claim 1, wherein the advertising content is further determined based on the contextual data.

5. The method of claim 1, further comprising obtaining an advertising content element from a server.

6. The method of claim 5, wherein determining the advertising content comprises constructing the advertising content using the advertising content element.

7. The method of claim 1, further comprising transmitting the presentation order to the user device.

8. A server comprising:
  a memory comprising computer instructions; and
  a processor coupled to the memory, wherein, in response to executing the computer instructions, the processor performs operations comprising:
    receiving a request for a first video from a user device;
    determining user data for the user device;
    determining advertising content based on the user data;
    determining contextual data for the first video;
    determining a plurality of videos based on the contextual data;
    determining, based on the contextual data, a presentation order from among a plurality of possible presentation orders for presenting the first video and the plurality of videos;
    transmitting the first video and the plurality of videos to the user device for automatic sequential presentation of the first video and the plurality of videos based on the presentation order; and
    transmitting the advertising content to the user device for presentation with the first video and the plurality of videos.

9. The server of claim 8, wherein the request comprises a user identifier, and wherein the operations further comprise determining the user data by obtaining the user data from a database using the user identifier.

10. The server of claim 8, wherein the operations further comprise determining user data by retrieving the user data from a cookie stored on the user device.

11. The server of claim 8, wherein the advertising content comprises a user input mechanism, and wherein the operations further comprise receiving additional user data via the user input mechanism.

12. The server of claim 8, wherein the operations further comprise transmitting a cue point in at least one of the first video and one of the plurality of videos to the user device.

13. The server of claim 12, wherein the cue point comprises at least one of a spatial location, a duration, a size, and a type of the advertising content to be inserted into at least one of the first video and the one of the plurality of videos.

14. The server of claim 12, wherein the operations further comprise receiving a request for additional content from the user device, wherein the request comprises an indication of the cue point.

15. A non-transitory computer-readable medium having computer-executable instructions stored thereon, the instructions comprising:
  instructions to receive a request for a first video from a user device;
  instructions to determine user data for the user device;
  instructions to determine advertising content based on the user data;
  instructions to determine contextual data for the first video;
  instructions to determine a plurality of videos based on the contextual data;
  instructions to determine, based on the contextual data, a presentation order from among a plurality of possible presentation orders for presenting the first video and the plurality of videos;
  instructions to transmit the first video and the plurality of videos to the user device for automatic sequential presentation of the first video and the plurality of videos based on the presentation order; and
  instructions to transmit the advertising content to the user device for presentation with the first video and the plurality of videos.

16. The non-transitory computer-readable medium of claim 15, further comprising instructions to transmit thumbnail images associated with each of the plurality of videos for presentation proximate to the first video.

17. The non-transitory computer-readable medium of claim 15, wherein the advertising content comprises at least one of a spatial location, a duration, a presentation time, and a size of the advertising content.

18. The non-transitory computer-readable medium of claim 15, further comprising instructions to receive second user data via a user input mechanism included in the advertising content, determine second advertising content based on the second user data, and transmit the second advertising content to the user device.

19. The non-transitory computer-readable medium of claim 15, further comprising instructions to receive a request for a second video from among the plurality of videos, determine second contextual data for the second video, determine a second plurality of videos based on the second contextual data, and transmit the second plurality of videos to the user device.

20. The non-transitory computer-readable medium of claim 15, wherein the advertising content comprises instructions to present a portion of the advertising content between presentations of the first video and the plurality of videos as the first video and the plurality of videos are automatically sequentially presented.

* * * * *